3,023,077
PROCESS OF PREPARING CYANOGEN HALIDE

Sebastian V. R. Mastrangelo, Brandywine Hundred, Del., assignor to E. I. du Pont de Nemours and Company, Wilmington, Del., a corporation of Delaware
No Drawing. Filed Sept. 24, 1959, Ser. No. 841,963
3 Claims. (Cl. 23—14)

This invention relates to a process for preparing a cyanogen halide and more particularly to a process for preparing cyanogen chloride from carbon, chlorine and nitrogen.

Cyanogen chloride is a useful, large-volume intermediate for the manufacture of such chemicals as cyanuric chloride, melamine, nitriles, amines and acids. Cyanuric chloride, for example, is a valuable component of fiber-reactive dyes while melamine is a constituent of one type of resin that composes attractive, hard, inert plastics for table and counter coverings and of another type that imparts wet strength to paper.

Cyanogen chloride is made at the present time by the chlorination of hydrogen cyanide or of sodium cyanide. These processes are somewhat complex, require the separate formation and isolation of a cyanide, and are relatively high in cost. The direct synthesis of cyanogen chloride by a low-cost, single-step procedure would be highly desirable.

It is an object of the present invention to provide a process for preparing a cyanogen halide. A further object is to prepare cyanogen chloride from carbon, chlorine and nitrogen. Other objects will appear hereinafter.

These and other objects are accomplished by a process which comprises reacting carbon, a halogen and nitrogen at a temperature of from about 1800° to 3600° C., followed by quenching of the product gases to 500° C. or below and condensing and separating the cyanogen halide thus produced. This process provides a simple method for the production of a cyanogen halide in good yield.

The mechanism by which the cyanogen halide is formed by the process of this invention is complex, but it is believed that in a simplified reaction scheme, such as in the reaction for cyanogen chloride, the chlorine and nitrogen are dissociated at the process temperatures to provide these elements in their atomic form, and the carbon becomes activated. These active states of the elements permit the formation of radicals among which is the cyanide radical which together with the chlorine radical is an intermediate in the formation of cyanogen chloride. For a given temperature an equilibrium among the starting elements, their active forms, and intermediate cyanide radical is believed to exist. At the high activating temperatures cyanogen chloride tends to dissociate, and the equilibrium is far on the side of the reactants that form the cyanogen chloride. Therefore, to obtain substantial yields of cyanogen chloride the gas stream is quenched to reduce the temperature to where the cyanogen chloride is stable before the intermediate cyanogen chloride-forming radicals, such as the cyanide radical and chlorine radical, can revert to the starting diatomic chlorine and nitrogen gases.

As noted above, the process is carried out by reacting carbon, a halogen and nitrogen at a temperature of from about 1800° to 3600° C. This may readily be accomplished by bringing the mixture of halogen and nitrogen gas into contact with the carbon which is heated to the required temperature. A suitable type of reactor could consist of a jacketed quartz tube enclosing an electrically heated graphite rod. Instead of a quartz reactor, one constructed of alumina or other refractory material that is inert toward the halogen and its reaction products of carbon and nitrogen at the process temperatures may be employed. Another type of reactor which would be suitable for large-scale commercial operations could consist of an electric furnace or electric arc furnace containing a fluidized or stationary bed of carbon particles. Non-electrical heat sources such as combustion reactions and focused solar heat rays may be used to supply the required heat. In a fluidized carbon bed reactor, graphite, other forms of carbon, alumina and other inert refractory materials may be used as materials of construction to contain the reactants.

Carbon from numerous sources may be used in the process of this invention. Such carbonaceous substances as charcoals, coals, cokes, channel blacks, furnace blacks, graphite, lamp blacks and even diamond may furnish the carbon for the reaction. The carbon may be present in such forms as bars, filaments, rods, beds of particulate material having spherical, cubical, pellet-like or irregular shapes. Graphite rods as a source of carbon, for example, may readily be heated electrically to provide the carbon at the high temperatures required for the reaction. Such rods are well adapted for an easily controlled operation of the process. Heated beds of carbon of small particle size provide a large surface area for the occurrence of the reaction.

The halogen which is used to carry out the process of this invention may be produced electrically or by other means but it is necessary that it be free from impurities such as hydrogen, oxygen, water or any other impurities containing hydrogen or oxygen. Such impurities in the halogen will preferentially combine at the reaction temperatures with the halogen or the carbon to form undesired by-products. Similarly, the nitrogen which is used should be free from any reactive impurities since they would cause the nitrogen to undergo undesirable reactions to form undesired by-products.

The elemental reactants, i.e. carbon, the halogen and nitrogen, are preferred for carrying out the process of the present invention since they are relatively low cost raw materials and, under the conditions of the reaction, will effectively product the desired cyanogen halide. If desired, however, compounds of carbon and the halogen which break down at the reaction temperature to the elements may be employed as reactants. Such compounds include carbon tetrachloride, tetrachloroethylene and hexachloroethane. For purposes of the present invention, the preferred halogen is chlorine. However, bromine may be used instead of chlorine in the process of this invention, in which case the resulting product would be cyanogen bromide.

As stated above, the temperature for carrying out the process of the invention should range from about 1800° to 3600° C. with a preferred temperature range being from about 2400° to 3000° C. At temperatures below about 1800° C. it is believed that the nitrogen reactant remains diatomic and tends to act as a diluent or inert material; however, as the temperature is increased, the amount of active nitrogen as well as active halogen and active carbon increases so that at the higher temperatures substantial yields of cyanogen halide are obtained. At temperatures above about 3600° C. undesirable decomposition may occur. Furthermore, the maintenance of temperatures above about 3600° C. is not considered economical. The present process may be operated at atmospheric, subatmospheric or superatmospheric pressure with a pressure of from about 0.1 atmosphere to 3.0 atmospheres being preferred.

The stoichiometric ratio of nitrogen to halogen to form the cyanogen halide from carbon, halogen and nitrogen is 1:1. In carrying out the process of the present invention the preferred ratio of nitrogen to halogen should be from about 2 to 3 volumes of nitrogen per volume of halogen since it has been determined that an excess of nitrogen, particularly at the preferred operating temperatures of 2400° to 3000° C., favors high conversions of the halogen to cyanogen halide. It has been determined that ratios of nitrogen to halogen much above 2 to 3 have an adverse dilution effect with the result that there is a needless waste of heat energy. When operating at temperatures of from about 1800° to 2400° C., it is desirable to avoid any excess of nitrogen over the stoichiometric amount, i.e. nitrogen:halogen of 1:1, since at these temperatures any excess of nitrogen tends to increase the dilution effect and tends to suppress the reaction.

The carbon that reacts to form cyanogen halide or an intermediate thereof is present in the gas phase, and the amount of this carbon is fixed by the vapor pressure of carbon at the operating temperature. Carbon is usually present in high excess of the stoichiometric amount needed for the reaction to serve as a heating medium for the nitrogen and halogen. The ratio of nitrogen and halogen to solid carbon has no significance so long as the solid carbon is sufficient to provide carbon vapor to react with the nitrogen and halogen that is passed through the reactor.

The halogen and nitrogen should be brought into contact with the carbon for a period of time which is long enough to allow the three reactants to reach an equilibrium mixture at the reaction temperature. Equilibration is very rapid at high temperatures, and residence times of from about one to ten milliseconds, are considered sufficient to establish equilibrium. Some minimum residence time within this range is needed while longer residence times may be employed without adverse effect.

After the halogen and nitrogen have been brought into contact with the carbon at the operating temperatures, it is necessary, in order to provide good yields of cyanogen halide, to quench or suddenly cool the gaseous products of the reaction to 500° C. or below. There is no lower limit on the temperature to which the products are suddenly cooled. For practical reasons, this lower limit should not go below about 0° C. The gaseous products should be cooled to the desired temperature in from about one to fifty milliseconds. The preferred quenching time is from about one to ten milliseconds. The quenching step is of considerable importance in the process of the present invention since, if the reaction products are allowed to cool slowly to temperatures below the operating temperature, it has been determined that little or no cyanogen halide is formed. It is believed that slow cooling gives rise to conditions which are equivalent to running the reaction at low temperatures instead of the high temperatures which are required. In order to operate the present process effectively, the high temperature gaseous equilibrium mixture should be quenched to temperatures where the cyanogen halide is stable.

After quenching of the gaseous product stream from the reaction, it is condensed and the desired cyanogen chloride separated therefrom. Quenching does not necessarily effect condensation of the gaseous reaction products. Unless the quenching temperature is considerably below the boiling point of the cyanogen halide, a condenser placed beyond the quenching tube or surface is needed to collect the product. The unreacted nitrogen and halogen can be recycled without condensation. Separation of cyanogen halide from the condensate may be accomplished by such means as distillation or crystallization.

The following examples will better illustrate the nature of the present invention; however, the invention is not intended to be limited to these examples. Parts are by weight unless otherwise indicated.

*Example 1*

The reactor consists of a quartz tube 1.25 inches in diameter and 22 inches long, fitted with a water jacket and brass and graphite electrodes and connected to cooled product receivers. Water-cooled brass electrodes are machined to fit 29/42 standard tapered joints fused to the ends of the quartz tube. Each electrode is bored to introduce gaseous reactants at one end and to remove reaction products at the other end. A graphite electrode 0.5 inch in diameter and 7½ inches long is piston-fitted into each brass electrode. The graphite electrodes in turn are piston-fitted to a graphite rod heating element and source of carbon 3/16 inch in diameter and 5½ inches long. When the reactor is assembled electric heating current passes from one brass electrode through a large diameter graphite electrode to the heating element (3/16" graphite rod) and finally from the element through the other large diameter graphite electrode and brass electrode. The current is supplied by two arc welding sources connected in parallel. The water jacket around the quartz tube, constructed of Pyrex brand glass, cools the inner surface of the quartz reactor tube by conduction to provide a quenching surface adjacent to the reaction zone. Chlorine and nitrogen gas flows are metered by orifice-type flow meters. The temperature of the graphite heating element is read by an optical pyrometer.

The graphite heating element is heated to 2700° C. with current at 310 amperes and 31 volts. Water at 30° C. circulates through the jacket of the reactor. Chlorine at the rate of 0.0020 mole per minute (0.14 g. or 44 cc. at STP/min.) together with nitrogen at the rate of 0.0045 mole per minute (0.125 g. or 100 cc. at STP/min.) are fed into one end of the reactor. The molar ratio of nitrogen to chlorine is about 2.3. After 40 to 45 minutes of operation 1.2 g. of product collects in a receiver cooled with solid carbon dioxide and about 5 g. of chlorine condenses in a receiver cooled with liquid nitrogen placed downstream from the receiver cooled with solid carbon dioxide. Quenching occurs by passage of the gas stream from the hot zone at the surface of the heated graphite element to the wall of the cooled jacket surrounding the reactor. The quenching time was of the order of 1 to 10 milliseconds. The product was identified by infrared analysis as mainly cyanogen chloride with minor amounts of carbon tetrachloride and tetrachloroethylene.

*Example 2*

The same procedure and conditions for the reaction described in Example 1 are followed except that the average reaction temperature is 2850° C. and the operation is continued for 145 minutes. About 3.6 g. of product, collects in the receiver cooled with solid carbon dioxide, is identified by mass spectroscopy as 99.4% cyanogen chloride and 0.6% carbon tetrachloride.

*Example 3*

Cyanogen chloride is produced by passing a mixture of chlorine and nitrogen gas through a bed of graphite heated to 2600° C. contained in a cylindrical graphite reactor electrically heated internally by a graphite helix. The graphite reactor, 5 inches in diameter and 10½ inches in length, is equipped with top and bottom electrodes and fittings interconnected by a graphite helix, a bottom inlet for the reactant gases, and a water-cooled copper exit tube (⅜" x 24") for quenching the gaseous products.

The reactor is charged with 500 cc. of powdered (50 to 150 mesh) graphite and heated to 2600° C. by passing 7.2 kw. of power through the helical graphite resistance heater (3½ x 7½") held within the reactor. Chlorine gas at a rate of 200 g. per hour together with nitrogen at a rate of 79 g. per hour, admitted through the bottom inlet of the reactor, is passed through the bed of heated graphite for 20 minutes at a total pressure of 172 mm. of mercury. The superficial gas velocity is 0.52 foot per second. The product gases are removed from the high temperature reaction zone at the top of the reactor through the water-cooled (25–30° C.) quenching tube and condensed in a receiver cooled with liquid nitrogen. The quenching tube is capable of cooling the product gases to 500° C. and below in about 5 milliseconds.

The products collected in the receiver are distilled below room temperature into a stainless steel cylinder. Of 55 grams of material collected 16 grams is cyanogen chloride identified by infrared spectroscopy and gas chromatography.

As many widely different embodiments of this invention may be made without departing from the spirit and scope thereof, it is to be understood that this invention is not limited to the specific embodiments thereof except as defined in the appended claims.

What is claimed is:

1. The process of preparing cyanogen halide which comprises bringing a halogen selected from the group consisting of chlorine and bromine, and nitrogen, in a stoichiometric ratio of nitrogen to halogen of at least 1:1, into contact with carbon at a temperature of from about 1800° to 3600° C. followed by quenching of the product gases to a temperature of not above 500° C. and condensing and separating the cyanogen halide thus obtained.

2. The process according to claim 1 wherein the temperature is from about 2400° to 3000° C.

3. A process according to claim 2 wherein the halogen is chlorine and the product obtained is cyanogen chloride.

References Cited in the file of this patent
UNITED STATES PATENTS
801,782    Gow _____ Oct. 10, 1905

OTHER REFERENCES

Smolin et al.: "s-Triazines and Derivatives," The Chemistry of Heterocyclic Compounds, publ. by Interscience Publishers Inc., N.Y., 50–51, 1959.

Lewis et al.: J.A.C.S., vol 40, 1918, p. 472.